United States Patent [19]

Kanota et al.

[11] Patent Number: 5,418,853
[45] Date of Patent: May 23, 1995

[54] APPARATUS AND METHOD FOR PREVENTING UNAUTHORIZED COPYING OF VIDEO SIGNALS

[75] Inventors: Keiji Kanota, Kanagawa; Hajime Inoue, Chiba; Yukio Kubota, Kanagawa, all of Japan

[73] Assignee: Sony Corporation, Tokyo, Japan

[21] Appl. No.: 94,433

[22] Filed: Jul. 21, 1993

[30] Foreign Application Priority Data

Jul. 24, 1992 [JP] Japan .................................. 4-218446

[51] Int. Cl.$^6$ .......................... H04N 7/16; H04N 5/76
[52] U.S. Cl. ............................................ 380/5; 380/3; 380/20; 380/23; 358/335; 358/339; 360/60
[58] Field of Search ........................ 380/3, 4, 5, 15, 20, 380/23, 49, 759; 358/349, 335, 339; 360/60; 348/5.5; 340/825.31, 825.34

[56] References Cited

U.S. PATENT DOCUMENTS

| | | | |
|---|---|---|---|
| 3,801,732 | 4/1974 | Reeves | 380/15 |
| 3,824,332 | 7/1974 | Horowitz | 380/15 |
| 3,919,462 | 11/1975 | Hartung et al. | 380/17 |
| 4,019,201 | 4/1977 | Hartung et al. | 380/17 |
| 4,100,575 | 7/1978 | Morio et al. | 380/5 |
| 4,163,253 | 7/1979 | Morio et al. | 380/5 |
| 4,213,149 | 7/1980 | Janko | 380/5 |
| 4,336,554 | 6/1982 | Okada et al. | 380/15 X |
| 4,439,785 | 3/1984 | Leonard | 380/5 |
| 4,475,129 | 10/1984 | Kagota | 380/5 |
| 4,479,146 | 10/1984 | Cohn | 358/147 |
| 4,488,176 | 12/1984 | Bond et al. | 380/5 |
| 4,488,183 | 12/1984 | Kinjo | 380/5 |
| 4,571,642 | 2/1986 | Hofstein | 380/5 |
| 4,631,603 | 12/1986 | Ryan | 360/60 X |
| 4,636,852 | 1/1987 | Farmer | 380/8 |
| 4,775,901 | 10/1988 | Nakano | 360/60 |
| 4,890,319 | 12/1989 | Seth-Smith et al. | 380/5 |
| 4,907,093 | 3/1990 | Ryan | 380/5 X |
| 5,057,947 | 10/1991 | Shimada | 360/60 |
| 5,157,510 | 10/1992 | Quan et al. | 358/335 |
| 5,177,618 | 1/1993 | Dunlap et al. | 358/335 |
| 5,182,680 | 1/1993 | Yamashita et al. | 360/60 |

FOREIGN PATENT DOCUMENTS

| | | | |
|---|---|---|---|
| 0224929 | 6/1987 | European Pat. Off. | G11B 20/00 |
| 256753 | 2/1988 | European Pat. Off. | G11B 20/00 |
| 0422849 | 4/1991 | European Pat. Off. | G11B 20/00 |
| 0574892 | 12/1993 | European Pat. Off. | H04N 9/80 |
| 52-132811 | 11/1977 | Japan | G11B 5/027 |
| 54-108612 | 8/1979 | Japan | G11B 5/86 |
| 57-176516 | 10/1982 | Japan | G11B 5/09 |
| 60-1660 | 7/1985 | Japan | G11B 20/10 |
| 2055501 | 3/1981 | United Kingdom | G11B 5/02 |
| 2104701 | 3/1983 | United Kingdom | G11B 27/28 |
| WO84/03166 | 8/1984 | WIPO | G11B 5/02 |
| WO85/02293 | 5/1985 | WIPO | G11B 20/00 |
| WO88/02588 | 4/1988 | WIPO | H04N 5/76 |

OTHER PUBLICATIONS

Electronic Industries Association of Japan, Technical File of Stereo Technical Committee, Video Technical Committee, STC-007, Consumer User PCM Encoder-Decoder, 1979-6.

Electronic Industries Association of Japan, Technical File of Stereo Technical Committee, Video Technical Committee, STC-007, Consumer User PCM Encoder-Decoder, 1979-6, Journal of the Audio Engineering Society, Apr. 1980, vol. 28, No. 4 pp. 260-265.

Todokoro et al., PCM Sound Recording and Playback System Utilizing VCR, Toshiba Review, vol. 35, No. 2, 1980, pp. 96-98.

International Electrotechnical Commission, Draft Standard-Digital Audio tape (DAT) cassette system; Part 6: Serial copy management system; Nov. 1989.

*Primary Examiner*—Bernarr E. Gregory
*Attorney, Agent, or Firm*—William S. Frommer; Alvin Sinderbrand

[57] ABSTRACT

In a digital video tape recorder (VTR) which reproduces digital video and audio signals from a magnetic tape, a copy protect bit in the reproduced digital video signal is detected, and on the basis of the copy protect bit, a code is generated and inserted into the vertical blanking interval of the reproduced video signal. When a video signal (which may be in analog or digital form) having the code in the vertical blanking interval is received in a digital VTR, the code is detected and recording of the video signal and an associated audio signal is inhibited if the code indicates that the received video signal is copy protected.

100 Claims, 5 Drawing Sheets

APPARATUS AND METHOD FOR PREVENTING UNAUTHORIZED COPYING OF VIDEO SIGNALS

BACKGROUND OF THE INVENTION

This invention relates to a method and apparatus for preventing copying of video signals which are intended to be copy protected and more particularly is directed to prevention of unauthorized copying of video signals transmitted or received by a digital video tape recorder (VTR).

There has been proposed a VTR for consumer use in which program information in the form of a video signal and an associated audio signal are recorded in digital form on a magnetic tape. Digital recording of video signals and associated audio signals make it possible for such program information to be reproduced and copied (or "dubbed") onto another tape with little or no deterioration in the quality of the signal reproduced from the copy tape. There are times, however, when it is desirable to prevent such signals from being recorded. For example, in order to protect the rights of those holding a copyright in the recorded material, copyright protection schemes have been proposed in which the digital recording format includes a bit for indicating that copying of the recorded digital video signal is to be inhibited. Such proposed copy protection systems are designed to prevent unauthorized copying of a signal that is transmitted in digital form from one digital VTR to another.

With respect to digital VTRs that can provide analog video and audio output and can receive analog video and audio signals as input signals, transmission of the video and audio signals in analog form from one digital VTR to another permits the receiving VTR to record a very high quality signal in digital form. The previously proposed copy protection systems for digital VTRs are not effective to prevent a digital VTR from recording a signal received in analog form, and the high quality of the resulting copies makes such copies a significant threat to the interests of those owning rights in the program information, such as copyright holders.

Moreover, there are a number of other sources of protectable program information in the form of video signals besides analog or digital video outputs from digital VTRs. Among these are television program signals broadcast from conventional terrestrial stations, television programs broadcast from satellites, video signals output from video disk players, television programming distributed by cable, and pay-per-view programming distributed by satellite or by cable. In some cases the broadcast signal may be free of any copyright but in other cases copyright is asserted. It is desirable that copying of the signals be prevented when a copyright is asserted with respect to the material represented by the signal or when the owner of such program information wishes to prevent unauthorized copying thereof.

OBJECTS AND SUMMARY OF THE INVENTION

Accordingly, it is an object of the present invention to provide a method and apparatus for preventing a digital VTR from recording video signals which are designated as copy protected signals.

Another object is to prevent a digital VTR from recording video signals as to which copyright is asserted.

A further object of this invention is to prevent a digital VTR from recording copy protected video signals which are received in analog form from a digital VTR or another source of video signals.

In accordance with an aspect of the present invention, a method of transmitting a video signal includes the steps of forming a digital code that includes at least a copy protection bit and category information which identifies a type of device from which the video signal is transmitted, multiplexing the digital code with a video signal having a vertical blanking interval to form a multiplexed video signal having the digital code in the vertical blanking interval, and transmitting the multiplexed video signal.

According to another aspect of the present invention, a video recording apparatus includes structure for receiving a multiplexed video signal which has a vertical blanking interval that includes a digital code containing at least a copy protection bit and category information for identifying the type of equipment from which the multiplexed video signal was transmitted, structure for receiving an audio signal associated with the multiplexed video signal, a copy protection circuit for determining whether or not copying of the video signal is permitted based on the copy protection bit and the category information, circuitry for recording the received video and audio signals if it is determined by the copy protection circuit that copying of the video signal is permitted, and circuitry for inhibiting recording of at least one of the video signal and the audio signal if it is determined by the copy protection circuit that copying of the video signal is not permitted.

According to further aspects of the invention, the circuitry for inhibiting recording includes structure for scrambling the video signal so that a scrambled video signal is recorded which cannot be satisfactorily reproduced, and structure for muting the audio signal so that the audio signal is not recorded.

The foregoing method and apparatus provide copy protection of video signals received in analog form by a digital VTR from another digital VTR or from other sources of analog video signals.

The above, and other objects, features and advantages of the present invention will be apparent from the following detailed description thereof which is to be read in connection with the accompanying drawings.

DETAILED DESCRIPTION OF THE PREFERRED EMBODIMENTS

Figures 1, 1A:
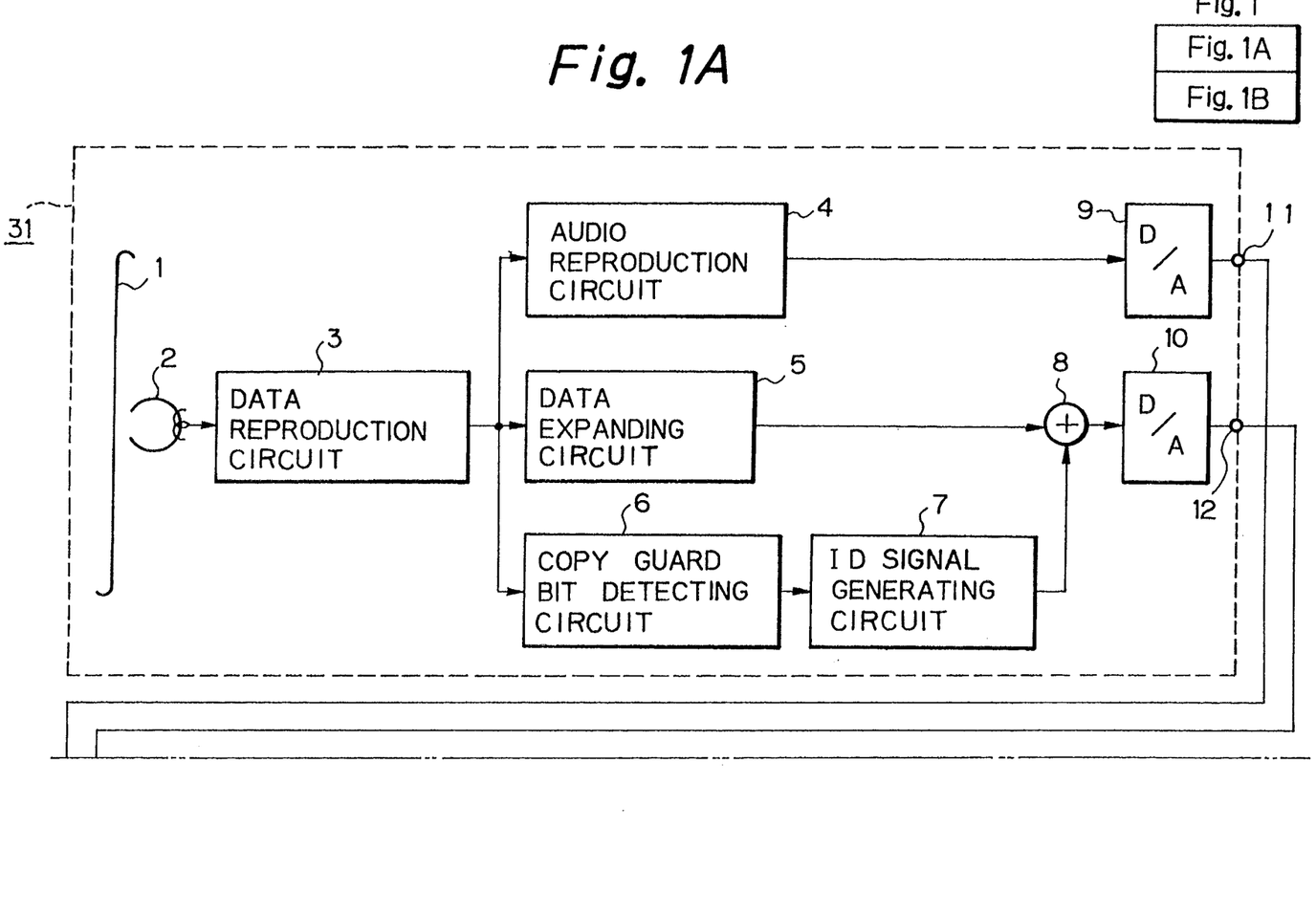
FIG. 1 and FIGS. 1A and 1B together from a block diagram of a reproducing section and a recording section of respective digital VTRs which are embodiments of the present invention.
Figure 1B:
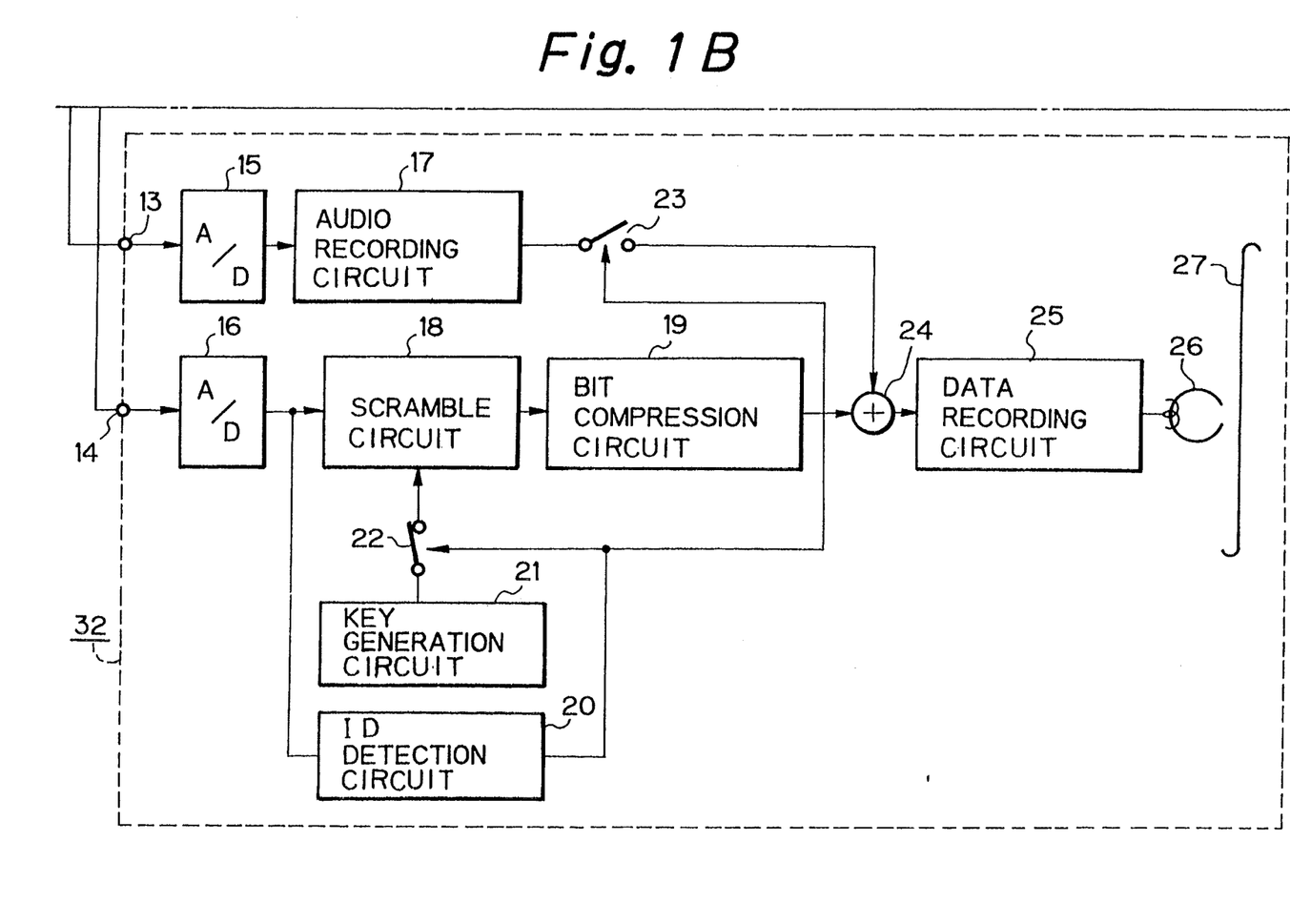

An embodiment of the present invention will now be described with reference to FIG. 1. FIG. 1 shows, in block form, a reproducing section 31 of a first digital VTR and a recording section 32 of a second digital VTR. In particular, FIG. 1 shows the portions of the reproducing section 31 needed for outputting analog signals, and the portions of recording section 32 needed for making a digital recording from analog input signals.

Reproducing section 31 includes an analog audio output terminal 11 and an analog video output terminal 12. Reproducing section 32 includes an analog audio input terminal 13 and an analog video input terminal 14. As shown in FIG. 1, the audio output terminal 11 of reproducing section 31 is connected to the audio input terminal 13 of recording section 32, and the video output terminal 12 of reproducing section 31 is connected to the video input terminal 14 of recording section 32.

Reproducing section 31 includes a magnetic tape 1 on which a digital video signal has been recorded in compressed form. The compressed digital video signal is reproduced from magnetic tape 1 by a magnetic head 2 and the reproduced signal is supplied to a data reproduction circuit 3. The reproduced digital signal is provided through the data reproduction circuit 3 to both an audio reproduction circuit 4 and a data expanding circuit 5. The audio reproduction circuit 4 outputs an audio signal which is supplied to a D/A converter 9. The D/A converter 9, in turn, generates an analog audio signal provided for output at audio output terminal 11.

The reproduced signal provided to the data expanding circuit 5 is expanded therein to form an expanded digital video signal which is provided to an adding circuit 8. The reproduced signal output from data reproduction circuit 3 is also supplied to a copy guard bit detecting circuit 6. The copy guard bit detecting circuit 6 determines whether copying of the signal recorded on the tape 1 is permitted. This determination is made on the basis of the state of a copy guard bit that is included in the data as recorded on the tape 1. A signal representing the result of the determination is output from the copy guard bit detecting circuit 6 to an ID signal generating circuit 7. On the basis of the output signal from the copy guard bit detecting circuit 6, the ID signal generating circuit 7 generates an ID signal which will be described below. The ID signal generated by the ID signal generating circuit 7 is provided to the adding circuit 8, which combines the ID signal with the expanded digital video signal output from data expanding circuit 5 so that the ID signal is inserted into at least one horizontal interval of the vertical blanking interval of the expanded digital video signal. The resulting multiplexed digital video signal, which includes the ID signal, is provided from the adding circuit 8 to a D/A converter 10. D/A converter 10 converts the multiplexed digital video signal into an analog video signal, which is provided as an output signal at video output terminal 12.

Figure 2:
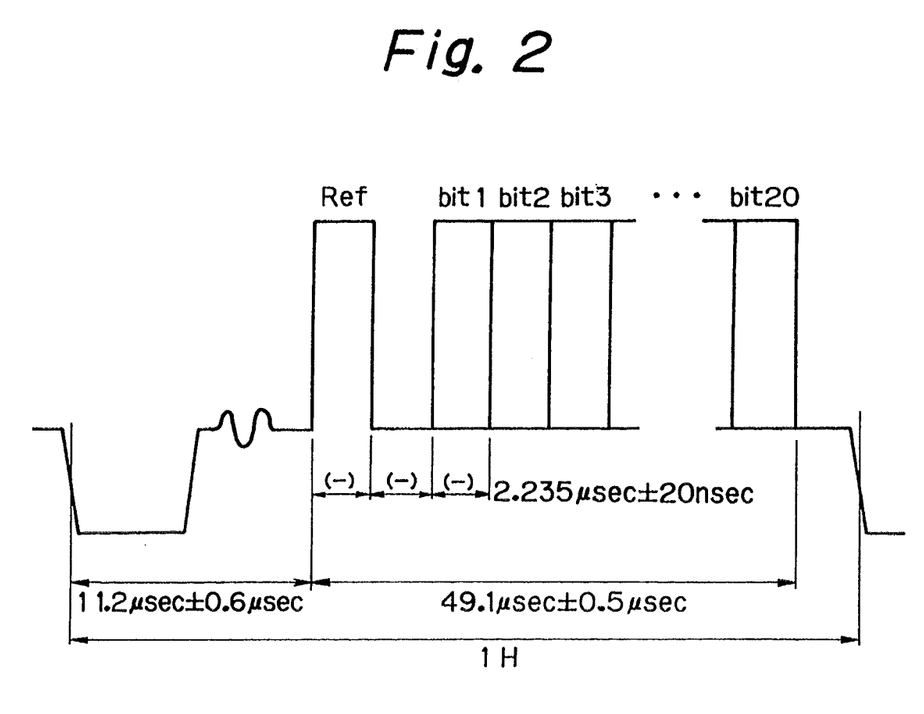
FIG. 2 is a waveform diagram which shows the format of an ID signal generated in the VTR reproducing section illustrated in FIG. 1.

The ID signal generated by ID signal generating circuit 7 will now be described in more detail with reference to FIGS. 2 and 3. FIG. 2 shows a horizontal line signal from the vertical blanking interval of the multiplexed video signal output from video output terminal 12. For example, the illustrated line interval may be line 21 or line 283 of an odd or even field interval, although other line intervals may be used. The horizontal line signal shown in FIG. 2 includes a reference bit near the beginning of the line, followed by bits 1 through 20 which make up the ID signal.

Figure 3:
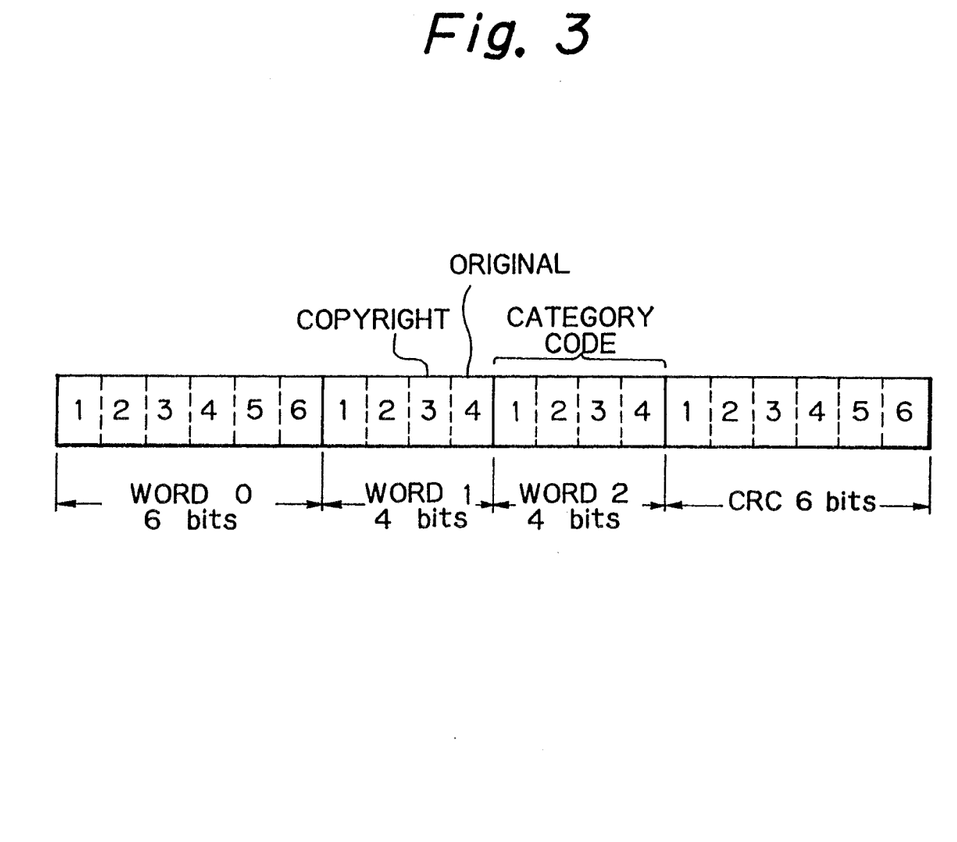
FIG. 3 is a schematic illustration showing additional details of the ID signal format of FIG. 2.

Referring now to FIG. 3, the 20 bits making up the ID signal comprise a word 0 consisting of 6 bits, a word 1 consisting of 4 bits, a word 2 consisting of 4 bits, and a cyclic redundancy code (CRC) consisting of 6 bits. The bits making up word 0 contain fundamental parameter and identification information with respect to a transmission format for the video signal. One of the bits of word 1 indicates whether or not copy protection is asserted with respect to the recorded material (e.g. whether the material is protected by copyright) and another bit included in word 1 indicates whether the recording is an original recording or a copy. For example, the third bit of word 1 may be the bit relating to copy protection, with the value "0" indicating that copying is to be prevented and value "1" indicating that copy protection is not asserted. Similarly, the fourth bit of word 1 may be used for indicating whether the recording is original. For example, if the fourth bit of word 1 has the value "0" this may signify that the material is "original" or proprietary, while the value "1" indicates that the material is commercially available.

The four bits of word 2 comprise a category code which identifies the type of device from which the video signal is being transmitted. In the present case, the category code would identify the type of device (consumer digital VTR) of which the reproducing section 31 is a part.

The 6-bit CRC following word 2 is a well-known type of error detection code and is used for detecting errors in the ID signal.

As will be seen, the ID signal can be used to determine whether or not to inhibit copying, with operation of a recording apparatus to be controlled on the basis of the determination.

Referring again to FIG. 1, the analog audio signal from the output terminal 11 and the analog video signal from the output terminal 12 are respectively received at the audio input terminal 13 and the video input terminal 14 of recording section 32.

The analog audio signal received at audio input terminal 13 is provided to an A/D converter 15, which converts the analog audio signal into a digital audio signal. The digital audio signal formed by A/D converter 15 is supplied to an audio recording circuit 17, which outputs a digital audio recording signal through a switch 23 to an adding circuit 24. The analog video signal received at video input terminal 14 is provided to an A/D converter 16, which converts the received analog video signal into a digital video signal. The digital video signal formed by A/D converter 16 is supplied through a scramble circuit 18 to a bit compression circuit 19. The bit compression circuit 19 compresses and encodes the digital video signal and the resulting compressed and encoded digital video signal is supplied to the adding circuit 24. The compressed and encoded digital video signal and the digital audio recording signal are combined at adding circuit 24 to form a synthesized signal, which is supplied to a data recording circuit 25. A data recording signal output from data recording circuit 25 is recorded on a magnetic tape 27 by means of a magnetic recording head 26.

The above-mentioned scramble circuit 18 is selectively connected to key generation circuit 21, by means of a switch 22, for receiving a key signal generated by the key generation circuit 21.

An ID detection circuit 20 is connected to receive the digital video signal formed by A/D converter 16 and is also connected to switches 22 and 23 for controlling the operating states thereof on the basis of an ID signal detected in the digital video signal by ID signal detection circuit 20. The ID signal detection circuit 20 determines on the basis of the detected ID signal whether or not copying of the input video and audio signals is permitted and controls the switches 22 and 23 depending on whether copying is permitted. The determination as to whether copying is permitted may be made, for example, according to rules such as the following: If the copy protection bit (bit 3) of word 1 has the value "1", then copying is permitted. If the value of that bit is "0" then whether copying is permitted depends on the category code (word 2). E.g., if bit 3 of word 1 is "0", and the type of device which is the source of the input signal, as indicated by the category code, is a consumer-use digital VTR, then copying is prohibited, but if the source of the input signal is a professional-use digital VTR, then copying is still permitted, even if bit 3 of word 1 is "0".

Operation of recording section 32, for recording the received audio and video signals when copying thereof is permitted, and for inhibiting recording of the signals when copying is not permitted, will now be described.

Let it first be assumed that copying of the received signal is permitted. In this case, the ID signal detection circuit 20 detects an ID signal, having the format described above with respect to FIGS. 2 and 3, in the digital video signal formed by A/D converter 16. The ID signal detection circuit 20 determines, from the copy protection bit (bit 3) of word 1, from the category code (word 2), and possibly also from the "original" bit of word 1, that copying of the received video and audio signals is permitted. On the basis of the determination (which for present purposes is assumed to indicate that copying is permitted), the ID signal detection circuit 20 causes switch 22 to be in an open position and causes switch 23 to be in a closed position.

Because switch 22 is open, no key signal is provided from the key generation circuit 21 to scramble circuit 18, and therefore the digital video signal formed by A/D converter 16 is provided in unscrambled form for bit compression by bit compression circuit 19. The resulting unscrambled, compressed digital video signal is then provided to adding circuit 24, which also receives the digital audio recording signal from audio recording circuit 17, because the switch 23 is in its closed position. The synthesized signal formed by adding circuit 24 is then provided for recording on magnetic tape 27 through data recording circuit 25 and magnetic head 26, as previously described. As a result, a copy of the audio and video input signals is formed on magnetic tape 27.

Next, let it be assumed that copying of the received video and audio signals is not permitted. As in the previous case, the ID signal detection circuit 20 detects the ID signal in the digital video signal formed by A/D converter 16, but this time ID signal detection circuit 20 determines from the ID signal that copying is not permitted. Based on this determination, ID signal detection circuit 20 causes switch 22 to be closed and switch 23 to be opened.

Because switch 22 is closed, a key signal generated by key generation circuit 21 is provided to scramble circuit 18, which causes the digital video signal provided from A/D converter 16 to be scrambled before it is supplied to bit compression circuit 19. At the same time, the digital audio recording signal formed by audio recording circuit 17 is not supplied to the adding circuit 24 because switch 23 is in an open position. In other words, the audio signal is "muted".

As a result, a scrambled digital video signal is recorded on magnetic tape 27 by means of the data recording circuit 25 and the magnetic head 26, the scrambling of the digital video signal being such that a satisfactory video picture cannot be reproduced and displayed from the signal recorded on the magnetic tape 27. It will also be understood that no audio signal is recorded on the tape 27.

Thus, in the embodiment of the invention as just described, copying of both an analog video signal and an associated analog audio signal received by a digital VTR are selectively inhibited on the basis of an ID signal present in a vertical blanking interval of the received analog video signal.

According to alternative embodiments of the invention, only recording of the video signal, or only recording of the audio signal, may be inhibited when the ID signal indicates that copying is not permitted.

According to another alternative embodiment of the invention, both a reproducing section 31 and a recording section 32, as described above in connection with FIG. 1, are incorporated in a single digital VTR, with a single tape transport mechanism being shared by the reproducing section 31 and the recording section 32, the tapes 1 and 27 therefore being one and the same, and the respective output terminals 11 and 12 and input terminals 13 and 14 not being interconnected. According to this embodiment, the reproducing section 31 operates to output to further apparatus a multiplexed analog video signal having an ID signal inserted in the vertical blanking interval of the video signal as described in connection with FIGS. 2 and 3. Also, the recording section 32 includes the ID signal detection circuit 20 and the other circuitry for inhibiting recording by this embodiment in accordance with an ID signal that is present in a multiplexed analog video signal that is received by this embodiment. It will be appreciated that this embodiment provides both ID signal generation and selective inhibition of recording, depending upon whether this embodiment is operating in a playback or recording mode. Accordingly, this embodiment is suitable for distribution to consumers as part of a copy protection system.

The present invention may also be embodied in a multiple-deck digital VTR incorporating all of the circuitry illustrated in FIG. 1, and with respective connections between analog audio input and output terminals and analog video input and output terminals, so that dubbing can be performed within the multiple-deck VTR by simultaneously using two tape transport decks. In this embodiment, such dubbing operations will be inhibited if the ID signal formed in the reproducing section indicates that copying is not permitted.

Selective inhibition of copying by a digital VTR in accordance with the invention can also be carried out in a system in which a digital VTR receives input video signals from sources in addition to another digital VTR.

Figure 4:
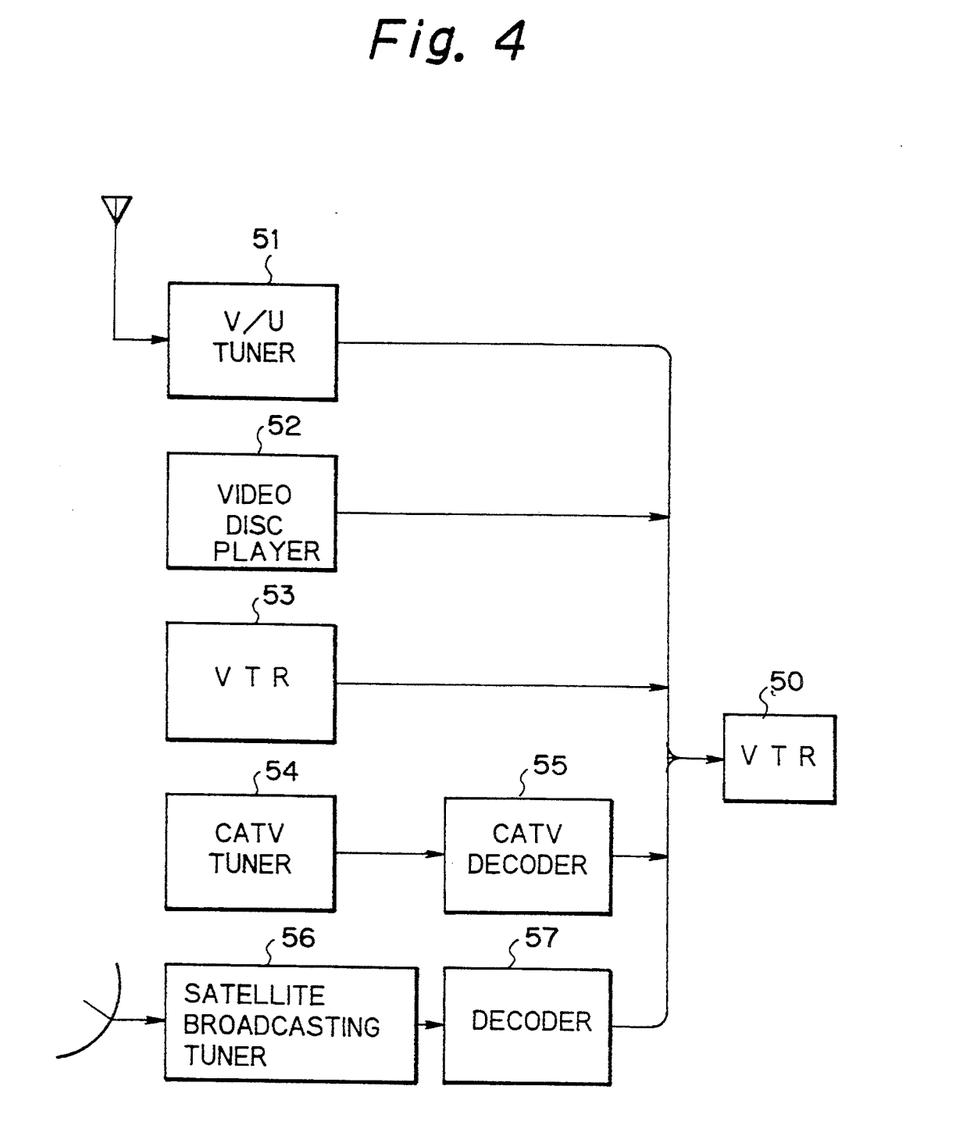
FIG. 4 is a block diagram of a video system in which the present invention may be applied.

For example, FIG. 4 shows a video system that includes a digital VTR 50 which has at least the recording section 32 as shown in FIG. 1 and another digital VTR 53 which has at least the reproducing section 31 as shown in FIG. 1. VTRs 50 and 53 are connected so that VTR 53 is a source of analog video and audio signals for VTR 50. Moreover, VTR 50 is also connected to receive analog video and audio input from a conventional VHF/UHF tuning receiver 51, and from a video disk player 52. The video disk player 52 may include, in accordance with the present invention, reproducing circuitry similar to the reproducing section 31 of FIG. 1, and including an ID signal generation circuit as described in connection with FIGS. 1-3.

A pay-per-view and/or pre-paid subscription cable receiving system made up of a cable T.V. tuner 54 and a cable T.V. decoder 55 also is a source of analog video and audio input signals for VTR 50, as is a satellite broadcast receiving system made up of a satellite broadcasting tuner 56 and a decoder 57. The ID signal generation and multiplexing functions described with respect to reproducing section 31 of FIG. 1 are, in accordance with the invention, included in the decoders 55 and 57 so that copying of the signals provided by the decoders 55 and 57 to the VTR 50 can be selectively inhibited on the basis of the ID signals generated in decoders 55 and 57.

It will be appreciated that an ID signal according to the format shown in FIGS. 2 and 3 may also be included in a multiplexed analog video signal broadcast from a terrestrial broadcasting station and received via tuner 51.

Therefore, in the embodiment of FIG. 4 selective inhibition of recording by VTR 50 of analog video signals supplied thereto from a variety of sources can be accomplished in accordance with ID signals present in the input video signals.

Having described specific preferred embodiments of the present invention with reference to the accompanying drawings, it is to be understood that the invention is not limited to those precise embodiments, and that various changes and modifications may be effected therein by one skilled in the art without departing from the scope or spirit of the invention as defined in the appended claims. For example, although reproducing section 31 and recording section 32 have been shown and described with D/A and A/D converters so that analog signals are transmitted and received, such D/A and A/D conversion may be omitted, and digital video signals having the ID signal in the vertical blanking interval may be transmitted and received directly.

What is claimed:

1. A method of transmitting a video signal comprising the steps of:
    forming a digital code that includes at least a copy protection bit and category information which identifies a type of device from which the video signal is transmitted;
    combining said digital code with a video signal having a vertical blanking interval to form a multiplexed video signal having said digital code in said vertical blanking interval; and
    transmitting said multiplexed video signal.

2. A method of transmitting a video signal according to claim 1; wherein said multiplexed video signal is transmitted in the form of an analog signal.

3. A video recording apparatus comprising:
    means for receiving a multiplexed video signal having a vertical blanking interval that includes a digital code containing at least a copy protection bit and category information for identifying a type of equipment from which the multiplexed video signal was transmitted;
    means for receiving an audio signal associated with said multiplexed video signal;
    means for determining whether or not copying of said video signal is permitted based on said copy protection bit and said category information;
    means for recording the received video and audio signals if it is determined by said means for determining that copying of said video signal is permitted; and
    means for inhibiting recording of at least one of said video signal and said audio signal if it is determined by said means for determining that copying of said video signal is not permitted.

4. A video recording apparatus according to claim 3; wherein said means for recording includes means for recording the received video and audio signals on a magnetic tape.

5. A video recording apparatus according to claim 3; wherein the received video and audio signals are analog signals and further comprising means for converting said signals to digital video and audio signals, said digital signals being recorded by said means for recording.

6. A video recording apparatus according to claim 3; wherein said means for inhibiting includes means for scrambling said video signal so that said means for recording records a scrambled video signal from which a video picture cannot be satisfactorily displayed.

7. A video recording apparatus according to claim 3; wherein said means for inhibiting includes means for muting said audio signal so that said audio signal is not recorded.

8. A video recording apparatus according to claim 3; further comprising:
    means for reproducing a digital video signal from a magnetic tape;
    means for detecting a copy guard signal that is present in said reproduced digital video signal;
    means for generating an ID signal in accordance with the detected copy guard signal;
    means for inserting said ID signal into a vertical blanking interval of said reproduced digital video signal to form a multiplexed digital video signal; and
    means for outputting said multiplexed digital video signal.

9. A video recording apparatus according to claim 8; wherein said reproduced digital video signal is a compressed digital video signal, and further comprising means for expanding said compressed digital video signal.

10. A video recording apparatus according to claim 8; wherein said means for outputting said multiplexed digital video signal includes means for converting said multiplexed digital video signal into an analog video signal having said ID signal in a vertical blanking interval thereof.

11. A video recording apparatus according to claim 3; further comprising:
    means for reproducing a digital video signal from a magnetic tape;
    means for converting said reproduced digital video signal into an analog video signal;
    means for detecting a copy guard signal that is present in said reproduced digital video signal;
    means for generating an ID signal in accordance with the detected copy guard signal;
    means for inserting said ID signal into a vertical blanking interval of said analog video signal; and
    means for outputting said analog video signal having said ID signal inserted in said vertical blanking interval of said analog video signal.

12. A video recording apparatus according to claim 11; wherein said reproduced digital video signal is a compressed digital video signal, and further comprising means for expanding said compressed digital video signal.

13. A method of transmitting a video signal comprising the steps of:

reproducing a digital video signal from a magnetic tape;

detecting a copy guard signal that is present in said reproduced digital video signal;

generating an ID signal in accordance with the detected copy guard signal;

inserting said ID signal into a vertical blanking interval of said reproduced digital video signal to form a multiplexed digital video signal;

converting said multiplexed digital video signal into an analog video signal having said ID signal in a vertical blanking interval of said analog video signal; and transmitting said analog video signal.

14. A method of transmitting a video signal according to claim 13 wherein said reproduced digital video signal is a compressed digital video signal, and further comprising the step of expanding said compressed digital video signal, said ID signal being inserted into a vertical blanking interval of said expanded digital video signal.

15. A method of transmitting a video signal according to claim 13; wherein said ID signal includes a copy protection bit for indicating whether said multiplexed digital video signal is to be protected from copying.

16. A method of transmitting a video signal according to claim 15; wherein said ID signal includes category information for identifying a type of device from which said analog video signal is transmitted.

17. A method of transmitting a video signal comprising the steps of:

reproducing a digital video signal from a magnetic tape;

converting said reproduced digital video signal into an analog video signal;

receiving said reproduced digital video signal before said reproduced digital video signal is converted into said analog video signal and detecting a copy guard signal that is present in said received digital video signal;

generating an ID signal in accordance with the detected copy guard signal;

inserting said ID signal into a vertical blanking interval of said analog video signal; and transmitting said analog video signal having said ID signal inserted in said vertical blanking period of said analog video signal.

18. A method of transmitting a video signal according to claim 17, wherein said reproduced digital video signal is a compressed digital video signal, and further comprising the step of expanding said compressed digital video signal before the same is converted into said analog video signal.

19. A method of transmitting a video signal according to claim 17; wherein said ID signal includes a copy protection bit for indicating whether said multiplexed digital video signal is to be protected from copying.

20. A method of transmitting a video signal according to claim 19; wherein said ID signal includes category information for identifying a type of device from which said analog video signal is transmitted.

21. A video reproducing apparatus comprising:

means for reproducing a digital video signal from a magnetic tape;

means for detecting a copy guard signal that is present in said reproduced digital video signal;

means for generating an ID signal in accordance with the detected copy guard signal;

means for inserting said ID signal into a vertical blanking interval of said reproduced digital video signal to form a multiplexed digital video signal; and means for outputting said multiplexed digital video signal.

22. A video reproducing apparatus according to claim wherein said reproduced digital video signal is a compressed 21; digital video signal, and further comprising means for expanding said compressed digital video signal.

23. A video reproducing apparatus according to claim 21; wherein said means for outputting said multiplexed digital video signal includes means for converting said multiplexed digital signal into an analog video signal having said ID signal in a vertical blanking interval thereof.

24. A video reproducing apparatus according to claim 21; wherein said ID signal includes a copy protection bit for indicating whether said multiplexed digital video signal is to be protected from copying.

25. A video reproducing apparatus according to claim 24; wherein said ID signal includes category information for identifying, a type of device from which said analog video signal is transmitted.

26. A video reproducing apparatus comprising:

means for reproducing a digital video signal from a magnetic tape;

means for converting said reproduced digital video signal into an analog video signal;

means for receiving said reproduced digital video signal before said reproduced digital video signal is converted into said analog video signal and for detecting a copy guard signal that is present in said received digital video signal;

means for generating an ID signal in accordance with the detected copy guard signal;

means for inserting said ID signal into a vertical blanking interval of said analog video signal; and means for outputting said analog video signal having said ID signal inserted in said vertical blanking interval of said analog video signal.

27. A video reproducing apparatus according to claim 26; wherein said reproduced digital video signal is a compressed digital video signal, and further comprising means for expanding said compressed digital video signal.

28. A video reproducing apparatus according to claim 26; wherein said ID signal includes a copy protection bit for indicating whether said analog video signal is to be protected from copying.

29. A video reproducing apparatus according to claim 28; wherein said ID signal includes category information for identifying a type of device from which said analog video signal is transmitted.

30. A video recording and reproducing apparatus comprising:

means for receiving a multiplexed video signal having a vertical blanking interval that includes a digital code containing at least a copyright protection bit and category information for identifying a type of equipment from which the multiplexed video signal was transmitted;

means for receiving an audio signal associated with said multiplexed video signal;

means for determining whether or not copying of said video signal is permitted based on said copyright protection bit and said category information;

means for recording the received video and audio signals if it is determined by said means for determining that copying of said video signal is permitted;

means for inhibiting recording of at least one of said video signal and said audio signal if it is determined by said means for determining that copying of said video signal is not permitted;

means for reproducing a digital video signal from a recording medium;

means for detecting a copy guard signal that is present in said reproduced digital video signal;

means for generating an ID signal in accordance with the detected copy guard signal;

means for inserting said ID signal into a vertical blanking interval of said reproduced digital video signal to form a multiplexed digital video signal; and means for outputting said multiplexed digital video signal.

31. A video recording and reproducing apparatus according to claim 30; wherein said recording medium is a magnetic tape.

32. A video recording and reproducing apparatus according to claim 31; wherein the received video and audio signals are analog signals and further comprising means for converting said signals to digital video and audio signals, said digital signals being recorded on said magnetic tape by said means for recording.

33. A video recording and reproducing apparatus according to claim 30; wherein said recording medium is a first magnetic tape and the received video and audio signals are analog signals, and further comprising means for converting said signals to digital video and audio signals, said digital signals being recorded by said means for recording on a second magnetic tape.

34. A video recording and reproducing apparatus according to claim 33; wherein said means for outputting said multiplexed digital video signal includes means for converting said multiplexed digital video signal into an analog video signal having said ID signal in a vertical blanking interval thereof, and further comprising means interconnecting said means for outputting and said means for receiving, said received analog video and audio signals including the analog video signal output from said means for outputting, said digital code included in said received video signal being said ID signal generated by said means for generating.

35. A video recording and reproducing apparatus according to claim 30; wherein said means for inhibiting includes means for scrambling said video signal so that said means for recording records a scrambled video signal from which a video picture cannot be satisfactorily displayed.

36. A video recording and reproducing apparatus according to claim 30; wherein said means for inhibiting includes means for muting said audio signal so that said audio signal is not recorded.

37. A video recording and reproducing apparatus according to claim 30; wherein said reproduced digital video signal is a compressed digital video signal, and further comprising means for expanding said compressed digital video signal.

38. A video recording and reproducing apparatus comprising:

means for receiving a multiplexed video signal having a vertical blanking interval that includes a digital code containing at least a copy protection bit and category information for identifying a type of equipment from which the multiplexed video signal was transmitted;

means for receiving an audio signal associated with said multiplexed video signal;

means for determining whether or not copying of said video signal is permitted based on said copy protection bit and said category information;

means for recording the received video and audio signals if it is determined by said means for determining that copying of said video signal is permitted;

means for inhibiting recording of at least one of said video signal and said audio signal if it is determined by said means for determining that copying of said video signal is not permitted;

means for reproducing a digital video signal from a recording medium;

means for converting said reproduced digital video signal into an analog video signal;

means for detecting a copy guard signal that is present in said reproduced digital video signal;

means for generating an ID signal in accordance with the detected copy guard signal;

means for inserting said ID signal into a vertical blanking interval of said analog video signal; and means for outputting said analog video signal having said ID signal inserted in said vertical blanking interval of said analog video signal.

39. A video recording and reproducing apparatus according to claim 38; wherein said recording medium is a magnetic tape.

40. A video recording and reproducing apparatus according to claim 39; wherein the received video and audio signals are analog signals and further comprising means for converting said signals to digital video and audio signals, said digital signals being recorded on said magnetic tape by said means for recording.

41. A video recording and reproducing apparatus according to claim 38; wherein said recording medium is a first magnetic tape and the received video and audio signals are analog signals, and further comprising means for converting said signals to digital video and audio signals, said digital signals being recorded by said means for recording on a second magnetic tape.

42. A video recording and reproducing apparatus according to claim 41; further comprising means interconnecting said means for outputting and said means for receiving, and wherein said received analog video and audio signals include the analog video signal output from said means for outputting, said digital code included in said received video signal being said ID signal generated by said means for generating.

43. A video recording and reproducing apparatus according to claim 38; wherein said means for inhibiting includes means for scrambling said video signal so that said means for recording records a scrambled video signal from which a video picture cannot be satisfactorily displayed.

44. A video recording and reproducing apparatus according to claim 38; wherein said means for inhibiting includes means for muting said audio signal so that said audio signal is not recorded.

45. A video recording and reproducing apparatus according to claim 38; wherein said reproduced digital video signal is a compressed digital video signal, and further comprising means for expanding said compressed digital video signal.

46. A method of recording a video signal comprising the steps of:
  receiving a multiplexed video signal having a vertical blanking interval that includes a digital code containing at least a copy protection bit and category information for identifying a type of equipment from which the multiplexed video signal was transmitted;
  receiving an audio signal associated with said multiplexed video signal;
  determining whether or not copying of said video signal is permitted based on said copy protection bit and said category information;
  recording the received video and audio signals if it is determined that copying of said video signal is permitted; and
  inhibiting recording of at least one of said video signal and said audio signal if it is determined that copying of said video signal is not permitted.

47. A method of recording a video signal according to claim 46; wherein said recording step includes recording the received video and audio signals on a magnetic tape.

48. A method of recording a video signal according to claim 46; wherein the received video and audio signals are analog signals and further comprising the step of converting said signals to digital video and audio signals, said recording step including recording said digital signals.

49. A method of recording a video signal according to claim 46; wherein said inhibiting step includes scrambling said video signal so that said recorded video signal is a scrambled video signal from which a video picture cannot be satisfactorily displayed.

50. A method of recording a video signal according to claim 46; wherein said inhibiting step includes muting said audio signal so that said audio signal is not recorded.

51. A method of reproducing a video signal comprising the steps of:
  reproducing a digital video signal from a magnetic tape;
  detecting a copy guard signal that is present in said reproduced digital video signal;
  generating an ID signal in accordance with the detected copy guard signal;
  inserting said ID signal into a vertical blanking interval of said reproduced digital video signal to form a multiplexed digital video signal; and
  outputting said multiplexed digital video signal.

52. A method of reproducing a video signal according to claim 51, wherein said reproduced digital video signal is a compressed digital video signal, and further comprising the step of expanding said compressed digital video signal.

53. A method of reproducing a video signal according to claim 51, wherein said outputting step includes converting said multiplexed digital signal into an analog video signal having said ID signal in a vertical blanking interval thereof.

54. A method of reproducing a video signal according to claim 51, wherein said ID signal includes a copy protection bit for indicating whether said multiplexed digital video signal is to be protected from copying.

55. A method of reproducing a video signal according to claim 54; wherein said ID signal includes category information for identifying a type of device from which said analog video signal is transmitted.

56. A method of reproducing a video signal comprising the steps of:
  reproducing a digital video signal from a magnetic tape;
  converting said reproduced digital video signal into an analog video signal;
  receiving said reproduced digital video signal before said reproduced digital video signal is converted into said analog video signal and detecting a copy guard signal that is present in said received digital video signal;
  generating an ID signal in accordance with the detected copy guard signal;
  inserting said ID signal into a vertical blanking interval of said analog video signal; and
  outputting said analog video signal having said ID signal inserted in said vertical blanking interval of said analog video signal.

57. A method of reproducing a video signal according to claim 56, wherein said reproduced digital video signal is a compressed digital video signal, and further comprising the step of expanding said compressed digital video signal.

58. A method of reproducing a video signal according to claim 56, wherein said ID signal includes a copy protection bit for indicating whether said multiplexed digital video signal is to be protected from copying.

59. A method of reproducing a video signal according to claim 58; wherein said ID signal includes category information for identifying a type of device from which said analog video signal is transmitted.

60. A method of recording and reproducing a video signal, comprising the steps of:
  receiving a multiplexed video signal having a vertical blanking interval that includes a digital code containing at least a copy protection bit and category information for identifying a type of equipment from which the multiplexed video signal was transmitted;
  receiving an audio signal associated with said multiplexed video signal;
  determining whether or not copying of said video signal is permitted based on said copy protection bit and said category information;
  if it is determined that copying of said video signal is permitted, recording the received video and audio signals in digital form on a recording medium, said digital form including a copy guard signal;
  inhibiting recording of at least one of said video signal and said audio signal if it is determined that copying of said video signal is not permitted;
  reproducing said digital video signal from said recording medium;
  detecting said copy guard signal that is present in said reproduced digital video signal;
  generating an ID signal in accordance with the detected copy guard signal;
  inserting said ID signal into a vertical blanking interval of said reproduced digital video signal to form a multiplexed digital video signal; and
  outputting said multiplexed digital video signal.

61. A method of recording and reproducing a video signal according to claim 60; wherein said recording medium is a magnetic tape.

62. A method of recording and reproducing a video signal according to claim 60; wherein the received video and audio signals are analog signals and further comprising the step of converting said signals to digital video and audio signals.

63. A method of recording and reproducing a video signal according to claim 60; wherein said inhibiting step includes scrambling said video signal so that said recorded video signal is a scrambled video signal from which a video picture cannot be satisfactorily displayed.

64. A method of recording and reproducing a video signal according to claim 60; wherein said inhibiting step includes muting said audio signal so that said audio signal is not recorded.

65. A method of recording and reproducing a video signal according to claim 60; wherein said digital video signal that is recorded on and reproduced from said recording medium is a compressed digital video signal, and further comprising the step of expanding said reproduced compressed digital video signal.

66. A method of recording and reproducing a video signal according to claim 60; wherein said outputting step includes converting said multiplexed digital signal into an analog video signal having said ID signal in a vertical blanking interval thereof.

67. A method of recording and reproducing a video signal according to claim 60; wherein said ID signal includes a copy protection bit for indicating whether said multiplexed digital video signal is to be protected from copying.

68. A method of recording and reproducing a video signal according to claim 67; wherein said ID signal includes category information for identifying a type of device from which said analog video signal is transmitted.

69. A method of recording and reproducing a video signal, comprising the steps of:
 receiving a multiplexed video signal having a vertical blanking interval that includes a digital code containing at least a copy protection bit and category information for identifying a type of equipment from which the multiplexed video signal was transmitted;
 receiving an audio signal associated with said multiplexed video signal;
 determining whether or not copying of said video signal is permitted based on said copy protection bit and said category information;
 if it is determined that copying of said video signal is permitted, recording the received video and audio signals in digital form on a recording medium, said digital form including a copy guard signal;
 inhibiting recording of at least one of said video signal and said audio signal if it is determined that copying of said video signal is not permitted;
 reproducing said digital video signal from said recording medium;
 converting said reproduced digital video signal into an analog video signal;
 detecting said copy guard signal that is present in said reproduced digital video signal;
 generating an ID signal in accordance with the detected copy guard signal;
 inserting said ID signal into a vertical blanking interval of said analog video signal; and
 outputting said analog video signal having said ID signal inserted in said vertical blanking interval of said analog video signal.

70. A method of recording and reproducing a video signal according to claim 69; wherein said recording medium is a magnetic tape.

71. A method of recording and reproducing a video signal according to claim 69; wherein the received video and audio signals are analog signals and further comprising the step of converting said signals to digital video and audio signals.

72. A method of recording and reproducing a video signal according to claim 69; wherein said inhibiting step includes scrambling said video signal so that said recorded video signal is a scrambled video signal from which a video picture cannot be satisfactorily displayed.

73. A method of recording and reproducing a video signal according to claim 69; wherein said inhibiting step includes muting said audio signal so that said audio signal is not recorded.

74. A method of recording and reproducing a video signal according to claim 69; wherein said digital video signal that is recorded on and reproduced from said recording medium is a compressed digital video signal, and further comprising the step of expanding said reproduced compressed digital video signal.

75. A method of recording and reproducing a video signal according to claim 69; wherein said ID signal includes a copy protection bit for indicating whether said multiplexed digital video signal is to be protected from copying.

76. A method of recording and reproducing a video signal according to claim 75; wherein said ID signal includes category information for identifying a type of device from which said analog video signal is transmitted.

77. An apparatus for transmitting a video signal, comprising:
 means for forming a digital code that includes at least a copy protection bit and category information which identifies a type of device from which the video signal is transmitted;
 means for combining said digital code with a video signal having a vertical blanking interval to form a multiplexed video signal having said digital code in said vertical blanking interval; and
 means for transmitting said multiplexed video signal.

78. An apparatus for transmitting a video signal according to claim 77; wherein said multiplexed video signal is transmitted in the form of an analog signal.

79. An apparatus for transmitting a video signal, comprising:
 means for reproducing a digital video signal from a magnetic tape;
 means for detecting a copy guard signal that is present in said reproduced digital video signal;
 means for generating an ID signal in accordance with the detected copy guard signal;
 means for inserting said ID signal into a vertical blanking interval of said reproduced digital video signal to form a multiplexed digital video
 means for converting said multiplexed digital video signal into an analog video signal having said ID signal in a vertical blanking interval of said analog video signal; and
 means for transmitting said analog video signal.

80. An apparatus for transmitting a video signal according to claim 79; wherein said reproduced digital video signal is a compressed digital video signal, and further comprising means for expanding said compressed digital video signal, said ID signal being inserted into a vertical blanking interval of said expanded digital video signal.

81. An apparatus for transmitting a video signal according to claim 79; wherein said ID signal includes a copy protection bit for indicating whether said multiplexed digital video signal is to be protected from copying.

82. An apparatus for transmitting a video signal according to claim 81; wherein said ID signal includes category information for identifying a type of device from which said analog video signal is transmitted.

83. An apparatus for transmitting a video signal, comprising:
  means for reproducing a digital video signal from a magnetic tape;
  means for converting said reproduced digital video signal into an analog video signal;
  means for receiving said reproduced digital video signal before said reproduced digital video signal is converted into said analog video signal and for detecting a copy guard signal that is present in said received digital video signal;
  means for generating an ID signal in accordance with the detected copy guard signal;
  means for inserting said ID signal into a vertical blanking interval of said analog video signal; and
  means for transmitting said analog video signal having said ID signal inserted in said vertical blanking interval of said analog video signal.

84. An apparatus for transmitting a video signal according to claim 83; wherein said reproduced digital video signal is a compressed digital video signal, and further comprising means for expanding said compressed digital video signal before the same is converted into said analog video signal.

85. An apparatus for transmitting a video signal according to claim 83; wherein said ID signal includes a copy protection bit for indicating whether said multiplexed digital video signal is to be protected from copying.

86. An apparatus for transmitting a video signal according to claim 85; wherein said ID signal includes category information for identifying a type of device from which said analog video signal is transmitted.

87. An apparatus for receiving a video signal, comprising:
  means for receiving a multiplexed video signal having a vertical blanking interval that includes a digital code containing at least a copy protection bit and category information for identifying a type of equipment from which the multiplexed video signal was transmitted; and
  means for determining whether or not copying of said video signal is permitted based on said copy protection bit and said category information.

88. An apparatus for receiving a video signal according to claim 87; wherein the received multiplexed video signal is an analog signal.

89. An apparatus for receiving a video signal, comprising:
  means for receiving a video signal that includes a copy guard signal, said means for receiving including means selected from the group consisting of means for decoding a cable television signal, means for decoding a satellite broadcast television signal and means for receiving an over-the-air broadcast television signal;
  means for detecting said copy guard signal included in said received video signal;
  means for generating an ID signal in accordance with the detected copy guard signal;
  means for inserting said ID signal into a vertical blanking interval of said received video signal to form a multiplexed video signal; and
  means for outputting said multiplexed video signal.

90. An apparatus for receiving a video signal according to claim 89; wherein said received video signal is a digital video signal.

91. An apparatus for receiving a video signal according to claim 89; wherein said means for outputting outputs said multiplexed video signal in analog form.

92. An apparatus for transmitting and receiving a video signal, comprising:
  means for forming a digital code that includes at least a copy protection bit and category information which identifies a type of device from which the video signal is transmitted;
  means for combining said digital code with a video signal having a vertical blanking interval to form a multiplexed video signal having said digital code in said vertical blanking interval;
  means for transmitting said multiplexed video signal;
  means for receiving said multiplexed video signal which was transmitted by said means for transmitting; and
  means for determining whether or not copying of said received video signal is permitted based on said copy protection bit and said category information contained in said vertical blanking interval of said received video signal.

93. An apparatus for transmitting and receiving a video signal according to claim 92; wherein said multiplexed video signal is transmitted and received in the form of an analog signal.

94. A method of receiving a video signal comprising the steps of:
  receiving a multiplexed video signal having a vertical blanking interval that includes a digital code containing at least a copy protection bit and category information for identifying a type of equipment from which the multiplexed video signal was transmitted; and
  determining whether or not copying of said video signal is permitted based on said copy protection bit and said category information.

95. A method of receiving a video signal according to claim 94; wherein the received multiplexed video signal is an analog signal.

96. A method of receiving a video signal comprising the steps of:
  receiving a video signal that includes a copy guard signal, said receiving step including a step selected from the group consisting of decoding a cable television signal, decoding a satellite broadcast television signal, and receiving an over-the-air broadcast television signal;
  detecting said copy guard signal included in said received video signal;
  generating an ID signal in accordance with the detected copy guard signal;
  inserting said ID signal into a vertical blanking period of said received video signal to form a multiplexed video signal; and
  outputting said multiplexed video signal.

97. A method of receiving a video signal according to claim 96; wherein said received video signal is a digital video signal.

98. A method of receiving a video signal according to claim 96; wherein said output multiplexed video signal is an analog signal.

99. A method of transmitting and receiving a video signal comprising the steps of:

forming a digital code that includes at least a copy protection bit and category information which identifies a type of device from which the video signal is transmitted;

combining said digital code with a video signal having a vertical blanking interval to form a multiplexed video signal having said digital code in said vertical blanking interval;

transmitting said multiplexed video signal;

receiving said transmitted multiplexed video signal; and determining whether or not copying of said received video signal is permitted based on said copy protection bit and said category information contained in said vertical blanking interval of said received video signal.

100. A method of transmitting and receiving a video signal according to claim 99; wherein said multiplexed video signal is transmitted and received in the form of an analog signal.

* * * * *